J. KING.
Spectacles.
No. 134,897.  Patented Jan. 14, 1873.
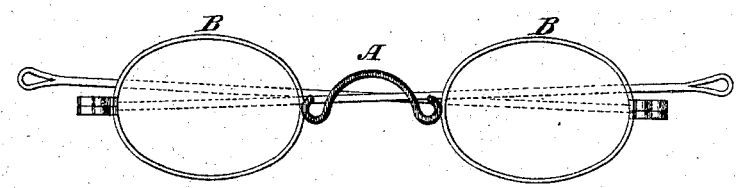
Witnesses:
Gustave Dieterich
Wm. H. C. Smith
Inventor:
Julius King.
Per Munn & Co
Attorneys.

UNITED STATES PATENT OFFICE.

JULIUS KING, OF WARREN, OHIO.

IMPROVEMENT IN SPECTACLES.

Specification forming part of Letters Patent No. 134,897, dated January 14, 1873.

*To all whom it may concern:*

Be it known that I, JULIUS KING, of Warren, in the county of Trumbull and State of Ohio, have invented a new and useful Improvement in Spectacles; and I do hereby declare that the following is a full, clear, and exact description thereof, which will enable others skilled in the art to make and use the same, reference being had to the accompanying drawing forming part of this specification.

This invention relates to a new and useful improvement in spectacles, having particular reference to the kind so extensively used and known as "steel-frame" spectacles. My invention consists in an improvement upon what are termed steel spectacles, which will be first fully described, and then clearly pointed out in the claim.

The accompanying drawing represents the article, which in shape or form does not differ from the ordinary steel-frame spectacles.

A is the bridge; B, the bows.

In manufacturing the steel-frame spectacles a difficulty has always been experienced in joining the bridge to the bows. It is necessary to solder or braze the steel bridge to the bows, and the heat required for this operation unavoidably burns the steel more or less, rendering it brittle and very liable to break at these points. The more expensive kinds of steel-frame spectacles are made extremely light and delicate, and the difficulty increases in proportion to their lightness. Another objection to the steel bridge is liability to oxidize from the perspiration of the nose. Especially are they liable to be thus damaged in warm weather, when they have been laid aside for any considerable length of time.

By making the bridge of silver, gold, or other non-oxidizable metal, the soldering of such metal to the steel is done at a much lower temperature, and without burning or rendering the metal brittle. The spectacles will not become rough or weakened from oxidization, and will present an ornamental and more desirable appearance.

I am aware that the bridge may be protected from oxidization by plating with non-oxidizable metal. This would but partly remedy the difficulties above named. I prefer to make the bridge of solid non-oxidizable metal.

Having thus described my invention, I claim as new and desire to secure by Letters Patent—

As an improvement in spectacles, the steel bows B B combined with bridge A of solid silver, or equivalent metal, to enable the soldering to be done at a lower temperature than where both are made of steel, to enable the steel to thereby remain uninjured by intensity of heat, and to produce a better and more durable article.

The above specification of my invention signed by me this 25th day of March, 1871.

JULIUS KING.

Witnesses:
GEO. W. MABEE,
T. B. MOSHER.